Patented Oct. 22, 1940

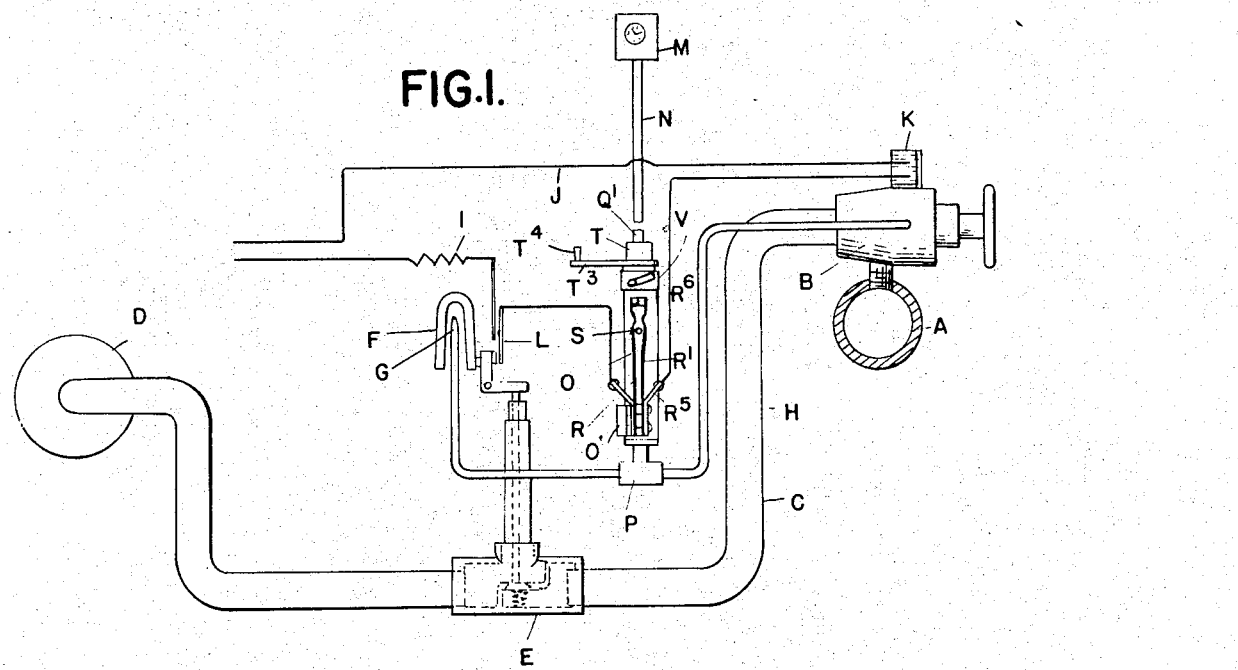
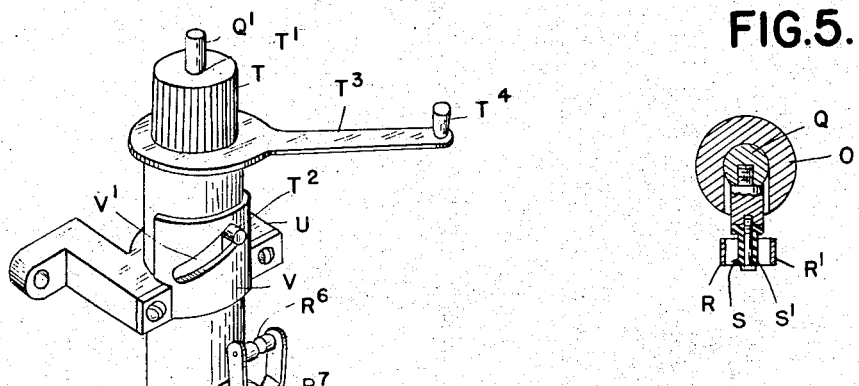

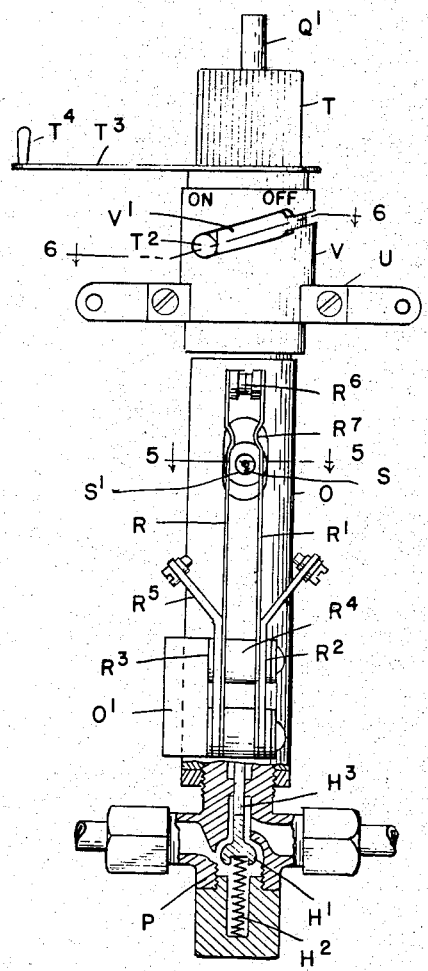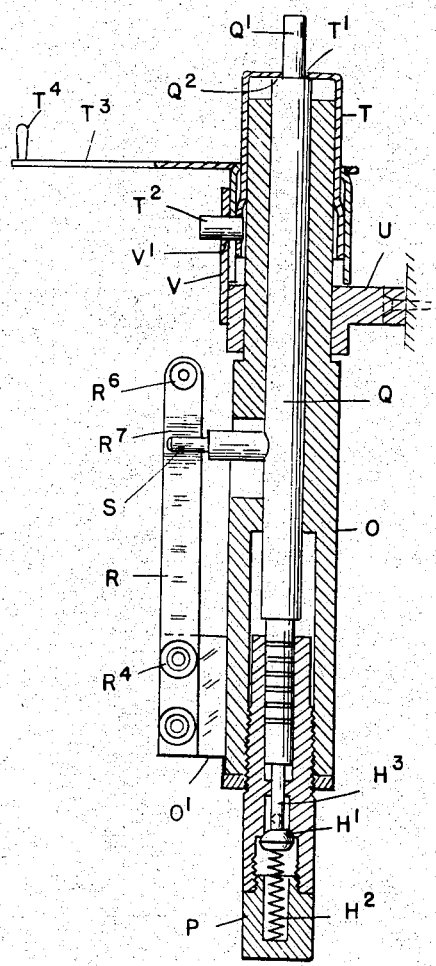

2,218,771

UNITED STATES PATENT OFFICE 2,218,771

CONTROLLING MEANS FOR GAS BURNERS

Earl W. Roberts and Thomas L. Ferrall, Detroit, Mich., assignors, by mesne assignments, to The Bryant Heater Company, Cleveland, Ohio, a corporation of Ohio Application July 12, 1937, Serial No. 153,218

11 Claims. (Cl. 158—117.1)

The invention relates to gas burners and associated means for alternatively controlling the same manually or automatically. More particularly, the invention relates to constructions in which the gas supplied to the burner is controlled by a thermostatically operated valve, which in turn is controlled by an associated gas pilot and an electric igniter for said pilot. For manual operation there is a second gas valve which controls the gas supplied to both the burner and to the pilot, while an electric switch associated with said second valve controls the igniter. It is the object of the present invention to obtain a simple construction of means for quickly changing from such manual control to an automatic control, as for instance by a clock, and to this end the invention consists in the construction as hereinafter set forth.

In the drawings:

Figure 1 is a diagram illustrating the relation of our improved controlling means to the burner operating mechanism;

Figure 2 is a perspective view of the device for shifting from manual to automatic control;

Figure 3 is a front elevation thereof;

Figure 4 is a vertical central section therethrough;

Figures 5 and 6 are cross sections respectively on line 5—5 and line 6—6 of Figure 3.

As diagrammatically represented in Figure 1, A is the manifold of a gas range. B is a manually operable valve which controls the supply of gas from said manifold to a conduit C leading to a burner D. E is an automatic valve in the conduit C which is normally closed, but is opened by the operation of a thermostat F. G is a gas pilot associated with the thermostat F. H is a gas supply conduit for the pilot G which also is controlled by the valve B. I is an electric igniter for the pilot G, which is in an electric circuit J having a controlling switch K associated with the valve B, and a breaker switch L associated with the thermostat. The arrangement is such that whenever the valve B is opened, gas is supplied therefrom to the conduits C and H and the switch K closes the electric circuit J to energize the igniter I. Gas is supplied to the pilot G from the conduit H and is ignited, but the gas in the conduit C is stopped by the valve E. As soon, however, as the heat of the pilot actuates the thermostat F this will open the valve E to supply gas to the burner D, which is then ignited from the pilot G. At the same time the operation of the thermostat will open the switch L so as to de-energize the igniter. When the valve B is manually closed the gas supply to the pilot G will be cut off and the cooling of the thermostat F will permit the closing of the valve E and also the closing of the circuit breaker L. The specific construction of the elements just described forms no part of the present invention and, therefore, will not be described more in detail.

As above stated, it is the object of the present invention to provide a simple means for changing from the manual control to a clock control, the construction being as follows:

M is the clock of any suitable construction adapted to be set for operation at any predetermined time and to thereby depress a rod or plunger N. Arranged in alignment with this plunger is a casing O which at its lower end has a valve casing P connected into the conduit H. The valve H' in the casing P is normally closed by the resilient pressure of a spring $H^2$ and is also provided with an upwardly extending stem $H^3$ which when depressed will open the valve. Q is a rod slidably mounted within the casing O with its lower end bearing against the stem $H^3$ and its upper end projecting slightly above said casing and into proximity to the rod N which is aligned therewith. Mounted on the casing O but insulated therefrom are the resilient members R and R' of an electric switch. As shown, the casing O has a forwardly projecting lug O' upon which the members R and R' are mounted by screws $R^2$. Insulator washers $R^3$ and spacers $R^4$ sleeved on these screws serve to insulate the members R and R' from the casing and from each other. There are also terminal members $R^5$ for connecting the members R and R' into the electric circuit J. At their free ends the members R and R' have contact pins $R^6$ which engage each other, and below these pins are inwardly bent or cam portions $R^7$. S is a lug projecting laterally from the rod Q and through a slot $O^2$ in the casing O to extend between the members R and R'. S' is an insulator sleeve on the lug S which in one position of the rod Q will extend between the portions $R^7$ of the members R and R' to spread the same apart and to break contact between the pin members $R^6$. This is the normal position of the parts, the valve H' being closed by the spring $H^2$ and the stem $H^3$ of said valve being raised and supporting the rod Q. At the upper end of the casing O is a sleeve T which is rotatable and longitudinally slidable on said casing, and at its upper end has an apertured head T'. The rod Q has a portion Q' reduced in diameter for passing through the aperture in this head and a shoulder $Q^2$ which normally bears against the head T'. U is a bracket member for supporting the casing O, and V is a segmental slotted guide on the bracket U adjacent to the sleeve T. The slot V' in the guide V extends spirally and a pin T² on the sleeve extends into this slot. T³ is a lever projecting radially from the sleeve T and having at its outer end a handle T⁴ by means of which the sleeve may be rotated to the extent permitted by the travel of the pin T² in the slot V'. With the construction just described when the lever T³ is in the position shown in Figure 2 with the pin T² to the right and upper end of the slot V', the valve H' will be closed by the spring H² and the rod Q will be raised so that the shoulder Q² is in contact with the head T', and the lug S will be between the portions R⁷ of the members R and R'. This will prevent any flow of gas through the conduit H from reaching the pilot G and by the separation of the contact pins R⁶, will open the electric circuit J. Thus, even though the valve B should be in open position to admit gas into the conduits H and C and to close the switch K, the burner D would remain inoperative. If, however, the clock M is operated to depress the rod N, this by pressing downward on the rod Q will open the valve H' and also permit the contacts R⁶ to close against each other. This results in the closing of the igniter circuit J and the supplying of gas to the pilot G which when ignited will heat the thermostat F, causing the operation of the same and the opening of the valve E. Gas will then be supplied to the burner D and ignited from the pilot. The burner will then continue in operation until a further operation of the clock will lift the rod N permitting the valve H' to close, thereby extinguishing the igniter and causing the thermostat to close the valve E.

Whenever it is desired to dispense with the automatic operation by the clock, the handle lever T³ is moved to the left, Figure 2, until the pin T² is at the left lower end of the slot V'. This will cause the head T' bearing against the shoulder Q² to depress the rod Q to a point where the valve H' is open and the lug S is withdrawn from between the portions R⁷, permitting the contact pins R⁶ to close. In this position of parts the burner may be manually controlled through the valve B so that whenever this valve is open the burner will be automatically lighted and when the valve is closed the burner will be extinguished.

The casing O and connected parts may be conveniently mounted at the rear of the gas range with the lever T³ projecting forward so as to be easily manipulated by the operator. The whole structure is supported by the bracket U which is secured by screws or other suitable means to the frame of the range.

What we claim as our invention is:

1. The combination with a gas burner, automatic control means for said burner including a gas pilot, an electric igniter therefor, a normally closed valve controlling the supply of gas to the burner, a thermostat for opening said valve operatively associated with said pilot, and manually operable means including a valve for the pilot gas supply and a switch for said igniter; of means for alternatively controlling said burner by said manually operable or automatic means comprising a second valve for said pilot, a second switch for said igniter, a common actuator for simultaneously opening said second valve and closing said second switch or closing said second valve and opening said second switch, means for locking said actuator in the open position of said second valve, and clock actuated means for operating said actuator when unlocked.

2. The combination with a gas burner, automatic control means therefor including a gas supply valve, a thermostat for operating the same, a gas pilot for said burner operatively associated with said thermostat, an electric igniter for said pilot, and manually operable means including a valve for the pilot gas supply and an associated switch for said igniter; of means for alternatively controlling said burner by said manually operable or automatic means comprising a second valve for said pilot, a second switch for said igniter, a common actuator for simultaneously opening said second valve and closing said second switch or closing said second valve and opening said second switch, means for locking said second actuator in the open position of said second valve, and clock actuated means for operating said actuator when unlocked.

3. The combination with a gas burner, automatic controlling means for said burner including a gas supply valve, a thermostat for opening said valve, a gas pilot for said burner operatively associated with said thermostat, an electric igniter for said pilot and manually operable means including a valve for the pilot gas supply, and a switch for said igniter; of means for alternatively controlling said burner by said manually operable or automatic means comprising, a second valve for controlling the pilot gas supply, an associated second switch for controlling said igniter, a rod for operating said second valve and second switch adapted when depressed to open the second valve and close the second switch and when raised to close the second valve and open the second switch, clock operated mechanism for actuating said rod, and manually operable means for locking said rod in depressed position.

4. The combination with a gas burner, automatic controlling means for said burner including a gas supply valve, a thermostat for opening said valve, a gas pilot for said burner operatively associated with said thermostat, a gas supply conduit for said pilot, an electric igniter for said pilot, and manually operable means including a valve for said gas supply conduit and a switch for said igniter; of means for alternatively controlling said burner by said manually operable or automatic means comprising a second valve for controlling said gas supply conduit, resilient means for closing said second valve, a rod for opening said second valve, a second electric switch for controlling said igniter, an arm projecting from said rod for operating said second switch to open the same when said second valve is closed and to close said second switch when said second valve is open, and means for actuating said rod to hold said second valve open and said second switch closed.

5. The combination with a gas burner, automatic controlling means for said burner including a gas supply valve, a thermostat for opening said valve, a gas pilot for said burner operatively associated with said thermostat, a gas supply conduit for said pilot, an electric igniter for said pilot, and manually operable means including a valve for said gas supply conduit and a switch for said igniter; of means for alternatively controlling said burner by said manually operable or automatic means comprising a second valve controlling said gas supply conduit, resilient means for closing the second valve, a rod operable to open said second valve, an arm projecting laterally from said rod, a second electric switch for controlling said igniter in operative relation to said arm such that when said second valve is closed said second switch is opened and when said second valve is opened said second switch is closed, clock operated mechanism for actuating said rod, and means for locking said rod to permit the control of said burner by said manually operable means.

6. The combination with a gas manifold, a manually operable gas cock connected to said manifold, a gas burner, a conduit for conducting gas from the gas cock to said burner, a gas pilot in igniting relation to the burner, a conduit for conducting gas from the gas cock to said pilot, a shut-off valve in the first mentioned conduit biased to automatically close, a thermostat for opening said valve operatively associated with said gas pilot, an electric igniter for the pilot, a control switch for said igniter actuable by the gas cock, and a breaker switch actuable by the thermostat when the valve is opened to de-energize the electric igniter for said pilot; of means for controlling the operation of the pilot including a valve in the second conduit, a second switch for the igniter, and means for simultaneously opening the second valve and closing the second switch or closing the second valve and opening the second switch.

7. The combination with a gas manifold, a manually operable gas cock connected to said manifold, a gas burner, a conduit for conducting gas from the gas cock to said burner, a gas pilot in igniting relation to the burner, a conduit for conducting gas from the gas cock to said pilot, a shut-off valve in the first mentioned conduit biased to automatically close, a thermostat for opening said valve operatively associated with said gas pilot, an electric igniter for the pilot, a control switch for said igniter actuable by the gas cock, and a breaker switch actuable by the thermostat when the valve is opened to de-energize the electric igniter for said pilot; of means for controlling the operation of the pilot including a valve in the second conduit, a second switch for the igniter, a common actuator for the last mentioned valve and second switch, and means for operating said actuator.

8. The combination with a gas manifold, a manually operable gas cock connected to said manifold, a gas burner, a conduit for conducting gas from the gas cock to said burner, a gas pilot in igniting relation to the burner, a conduit for conducting gas from the gas cock to said pilot, a shut-off valve in the first mentioned conduit biased to automatically close, a thermostat for opening said valve operatively associated with said gas pilot, an electric igniter for the pilot, a control switch for said igniter actuable by the gas cock, and a breaker switch actuable by the thermostat when the valve is opened to de-energize the electric igniter for said pilot; of means for controlling the operation of the pilot including a valve in the second conduit, a second switch for the igniter, a common actuator for the last mentioned valve and second switch, means operable automatically to operate said actuator, and means operable manually to render said automatically operable means inoperative.

9. The combination with a gas burner, a normally closed valve controlling the supply of gas to said burner, a gas pilot for said burner, a normally closed valve controlling the supply of gas to said pilot, a manually operable valve controlling the supply of gas to both valves aforesaid, and an electric igniter for said pilot, of a normally closed breaker switch in circuit with the igniter, a normally open electric switch in circuit with the igniter and switch aforesaid and adapted to be closed by said manually operable valve, a thermostat operable by the pilot and adapted to open the breaker switch and to open the first mentioned normally closed valve, a normally open electric switch in circuit with the igniter and switches aforesaid, and means for substantially simultaneously opening the second mentioned normally closed valve and causing the last mentioned normally open switch to be closed.

10. The combination with a gas burner, a normally closed valve controlling the supply of gas to said burner, a gas pilot for said burner, a normally closed valve controlling the supply of gas to said pilot, a manually operable valve controlling the supply of gas to both valves aforesaid, and an electric igniter for said pilot, of a normally open electric switch in circuit with the igniter and adapted to be closed by said manually operable valve, a thermostat operable by the pilot and adapted to open the first mentioned normally closed valve, a normally open electric switch in circuit with the igniter and switch aforesaid, and means for substantially simultaneously opening the second mentioned normally closed valve and causing the last mentioned normally open switch to be closed.

11. The combination with a gas burner, a gas pilot for said burner, a normally closed valve controlling the supply of gas to said pilot, a manually operable valve controlling the supply of gas to the normally closed valve aforesaid, and an electric igniter for said pilot, of a normally open electric switch in circuit with the igniter and adapted to be closed by said manually operable valve, a normally open electric switch in circuit with the igniter and switch aforesaid, and means for substantially simultaneously opening the second mentioned normally closed valve and causing the last mentioned normally open switch to be closed.

EARL W. ROBERTS.
THOMAS L. FERRALL.